(12) United States Patent
Molter et al.

(10) Patent No.: US 9,995,148 B2
(45) Date of Patent: Jun. 12, 2018

(54) METHOD AND APPARATUS FOR COOLING GAS TURBINE AND ROTOR BLADES

(71) Applicant: General Electric Company, Schenectady, NY (US)

(72) Inventors: Stephen Mark Molter, Cincinnati, OH (US); Steven Robert Brassfield, Cincinnati, OH (US); Shawn Michael Pearson, Cincinnati, OH (US); Mark Edward Stegemiller, Franklin, OH (US)

(73) Assignee: General Electric Company, Schenectady, NY (US)

( * ) Notice: Subject to any disclaimer, the term of this patent is extended or adjusted under 35 U.S.C. 154(b) by 1264 days.

(21) Appl. No.: 13/800,426

(22) Filed: Mar. 13, 2013

(65) Prior Publication Data

US 2014/0322008 A1    Oct. 30, 2014

Related U.S. Application Data

(60) Provisional application No. 61/709,348, filed on Oct. 4, 2012.

(51) Int. Cl.
  *F01D 5/18* (2006.01)
  *F01D 5/14* (2006.01)

(52) U.S. Cl.
  CPC .............. *F01D 5/187* (2013.01); *F01D 5/147* (2013.01); *F01D 5/18* (2013.01); *F01D 5/186* (2013.01); *F01D 5/188* (2013.01); *F05D 2250/185* (2013.01); *F05D 2260/20* (2013.01); *F05D 2260/202* (2013.01); *F05D 2260/203* (2013.01); *F05D 2260/2212* (2013.01); *Y02T 50/67* (2013.01); *Y02T 50/676* (2013.01)

(58) Field of Classification Search
  CPC .......... F01D 5/187; F01D 5/186; F01D 5/188; F01D 5/18; F01D 5/147; Y02T 50/676; Y02T 50/67; F05D 2260/2212; F05D 2260/202; F05D 2250/185; F05D 2260/20; F05D 2260/203
  USPC ....................................... 416/97 A
  See application file for complete search history.

(56) References Cited

U.S. PATENT DOCUMENTS

| | | |
|---|---|---|
| 4,270,883 A | 6/1981 | Corrigan |
| 4,293,275 A | 10/1981 | Kobayashi et al. |
| 4,416,585 A | 11/1983 | Abdel-Messeh |

(Continued)

FOREIGN PATENT DOCUMENTS

| | | |
|---|---|---|
| CN | 1987053 A | 6/2007 |
| CN | 101025091 A | 8/2007 |

(Continued)

OTHER PUBLICATIONS

Unofficial English Translation of Chinese Office Action issued in connection with corresponding CN Application No. 201380051935.6 dated Oct. 27, 2015.

(Continued)

*Primary Examiner* — Mark Laurenzi
*Assistant Examiner* — Wesley Harris
(74) *Attorney, Agent, or Firm* — General Electric Company; William Scott Andes

(57) ABSTRACT

Apparatuses and methods are taught for cooling a turbine blade wherein at least one circuit is isolated along a cool suction side of the blade and the circuit turns aft toward a trailing edge.

19 Claims, 5 Drawing Sheets

(56) References Cited

U.S. PATENT DOCUMENTS

| | | |
|---|---|---|
| 4,474,532 A | 10/1984 | Pazder |
| 4,515,526 A | 5/1985 | Levengood |
| 4,775,296 A | 10/1988 | Schwarzmann et al. |
| 5,288,207 A | 2/1994 | Linask |
| 5,356,265 A * | 10/1994 | Kercher ............... F01D 5/186 416/97 R |
| 5,395,212 A | 3/1995 | Anzai et al. |
| 5,484,258 A | 1/1996 | Isburgh et al. |
| 5,498,133 A * | 3/1996 | Lee ..................... F01D 5/186 416/97 R |
| 5,611,662 A | 3/1997 | Cunha |
| 5,681,144 A | 10/1997 | Spring et al. |
| 5,702,232 A | 12/1997 | Moore |
| 5,704,763 A | 1/1998 | Lee |
| 5,931,638 A | 8/1999 | Krause et al. |
| 6,036,441 A | 3/2000 | Manning et al. |
| 6,099,251 A | 8/2000 | LaFleur |
| 6,174,134 B1 | 1/2001 | Lee et al. |
| 6,254,346 B1 | 7/2001 | Fukuno et al. |
| 6,290,462 B1 | 9/2001 | Ishiguro et al. |
| 6,331,098 B1 | 12/2001 | Lee |
| 6,406,260 B1 | 6/2002 | Trindade et al. |
| 6,416,283 B1 | 7/2002 | Johnson et al. |
| 6,431,832 B1 | 8/2002 | Glezer et al. |
| 6,582,584 B2 | 6/2003 | Lee et al. |
| 6,607,355 B2 | 8/2003 | Cunha et al. |
| 6,609,884 B2 | 8/2003 | Harvey |
| 6,644,921 B2 | 11/2003 | Bunker |
| 6,705,836 B2 | 3/2004 | Bourriaud et al. |
| 6,722,134 B2 | 4/2004 | Bunker |
| 6,890,154 B2 | 5/2005 | Cunha |
| 6,916,150 B2 | 7/2005 | Liang |
| 6,932,573 B2 | 8/2005 | Liang |
| 6,939,102 B2 | 9/2005 | Liang |
| 6,981,846 B2 | 1/2006 | Liang |
| 6,984,102 B2 | 1/2006 | Bunker et al. |
| 7,094,031 B2 | 8/2006 | Lee et al. |
| 7,097,426 B2 | 8/2006 | Lee et al. |
| 7,104,757 B2 | 9/2006 | Gross |
| 7,128,533 B2 | 10/2006 | Liang |
| 7,137,781 B2 | 11/2006 | Harvey et al. |
| 7,186,084 B2 | 3/2007 | Bunker et al. |
| 7,195,458 B2 | 3/2007 | Liang |
| 7,296,973 B2 | 11/2007 | Lee et al. |
| 7,300,242 B2 | 11/2007 | Liang |
| 7,303,376 B2 | 12/2007 | Liang |
| 7,377,746 B2 | 5/2008 | Brassfield et al. |
| 7,387,492 B2 | 6/2008 | Pang et al. |
| 7,399,160 B2 | 7/2008 | Harvey et al. |
| 7,413,407 B2 | 8/2008 | Liang |
| 7,416,391 B2 | 8/2008 | Veltre et al. |
| 7,445,432 B2 | 11/2008 | Levine et al. |
| 7,481,623 B1 | 1/2009 | Liang |
| 7,520,723 B2 | 4/2009 | Liang |
| 7,534,089 B2 | 5/2009 | Liang |
| 7,547,190 B1 | 6/2009 | Liang |
| 7,547,191 B2 | 6/2009 | Liang |
| 7,568,887 B1 | 8/2009 | Liang |
| 7,624,787 B2 | 12/2009 | Lee et al. |
| 7,637,720 B1 | 12/2009 | Liang |
| 7,665,965 B1 | 2/2010 | Liang |
| 7,690,892 B1 | 4/2010 | Liang |
| 7,699,583 B2 | 4/2010 | Cunha |
| 7,713,026 B1 | 5/2010 | Liang |
| 7,722,327 B1 | 5/2010 | Liang |
| 7,766,616 B2 | 8/2010 | Baldauf et al. |
| 7,766,618 B1 | 8/2010 | Liang |
| 7,806,658 B2 | 10/2010 | Liang et al. |
| 7,824,156 B2 | 11/2010 | Dellmann et al. |
| 7,857,589 B1 | 12/2010 | Liang |
| 7,866,948 B1 | 1/2011 | Liang |
| 7,901,183 B1 | 3/2011 | Liang |
| 7,938,168 B2 | 5/2011 | Lee et al. |
| 7,938,624 B2 | 5/2011 | Tibbott |
| 7,950,903 B1 | 5/2011 | Liang |
| 7,976,277 B2 | 7/2011 | Kopmels et al. |
| 7,985,050 B1 | 7/2011 | Liang |
| 8,016,564 B1 * | 9/2011 | Liang ..................... F01D 5/186 415/115 |
| 9,033,652 B2 | 5/2015 | Molter et al. |
| 2003/0044277 A1 | 3/2003 | Bourriaud et al. |
| 2005/0084370 A1 | 4/2005 | Gross et al. |
| 2006/0099073 A1 | 5/2006 | Djeridane et al. |
| 2006/0222494 A1 | 10/2006 | Liang |
| 2007/0059172 A1 | 3/2007 | Lee et al. |
| 2007/0116570 A1 | 5/2007 | Boury et al. |
| 2007/0128034 A1 | 6/2007 | Lee et al. |
| 2007/0147997 A1 | 6/2007 | Cunha et al. |
| 2007/0297916 A1 | 12/2007 | Levine et al. |
| 2007/0297917 A1 | 12/2007 | Levine et al. |
| 2008/0273987 A1 | 11/2008 | Liang |
| 2009/0087312 A1 | 4/2009 | Bunker et al. |
| 2010/0040480 A1 | 2/2010 | Webster et al. |
| 2010/0104419 A1 | 4/2010 | Liang |
| 2010/0166564 A1 | 7/2010 | Benjamin et al. |
| 2010/0221121 A1 | 9/2010 | Liang |
| 2010/0221123 A1 | 9/2010 | Pal et al. |
| 2010/0226761 A1 | 9/2010 | Liang |
| 2010/0226791 A1 | 9/2010 | Fujimura et al. |
| 2010/0247328 A1 | 9/2010 | Cunha |
| 2010/0303635 A1 | 12/2010 | Townes et al. |
| 2011/0038709 A1 | 2/2011 | Liang et al. |
| 2011/0120979 A1 | 5/2011 | Kaga et al. |
| 2011/0164960 A1 | 7/2011 | Maldonado |

FOREIGN PATENT DOCUMENTS

| | | |
|---|---|---|
| EP | 0896127 A2 | 2/1999 |
| EP | 0916810 A2 | 5/1999 |
| EP | 2087206 | 3/2010 |
| GB | 2246174 A | 1/1992 |
| JP | 54130154 A | 10/1979 |
| JP | 61118502 A | 6/1986 |
| JP | 04358701 A | 12/1992 |
| JP | H05312002 | 11/1993 |
| JP | H062502 | 1/1994 |
| JP | H08271083 | 10/1996 |
| JP | H08338202 | 12/1996 |
| JP | 2002129903 | 5/2002 |
| JP | 2005299637 A | 10/2005 |
| JP | 2007002843 A | 1/2007 |
| JP | 2007154893 A | 6/2007 |
| JP | 2007170379 A | 7/2007 |
| JP | 4500883 B2 | 7/2010 |
| JP | 2011516780 A | 5/2011 |
| WO | 2009124585 A1 | 10/2009 |

OTHER PUBLICATIONS

PCT Search Report and Written Opinion dated Jan. 16, 2014, issued in connection with corresponding WO Patent Application No. PCT/US2013-060635.

Unofficial English Translation of Japanese Office Action issued in connection with related JP Application No. 2014-533563 dated Jun. 14, 2016.

Unofficial English Translation of Japanese Search report issued in connection with related JP Application No. 2014533563 dated Jan. 20, 2017.

Machine Translation and Japanese Office Action issued in connection with corresponding JP Application No. 2015535680 dated Jul. 4, 2017.

* cited by examiner

METHOD AND APPARATUS FOR COOLING GAS TURBINE AND ROTOR BLADES

CROSS-REFERENCE TO RELATED APPLICATIONS

This application claims priority to and benefit under 35 U.S.C. § 119(e) to U.S. Provisional Patent Application Ser. No. 61/709,348 filed Oct. 4, 2012, in the name of the present inventors, this provisional application being incorporated herein by reference.

BACKGROUND

Present embodiments relate generally to gas turbine engines and more particularly, but not by way of limitation, to methods and apparatuses for cooling gas turbine engine rotor assemblies.

In the gas turbine engine, air is pressurized in a compressor and mixed with fuel in a combustor for generating hot combustion gases which flow downstream through turbine stages. These turbine stages extract energy from the combustion gases. A high pressure turbine includes a first stage nozzle and a rotor assembly having a disk and a plurality of turbine blades. The high pressure turbine first receives the hot combustion gases from the combustor and includes a first stage stator nozzle that directs the combustion gases downstream through a row of high pressure turbine rotor blades extending radially outwardly from a first rotor disk. In a two stage turbine, a second stage stator nozzle is positioned downstream of the first stage blades followed in turn by a row of second stage turbine blades extending radially outwardly from a second rotor disk. The stator nozzles direct the hot combustion gas in a manner to maximize extraction at the adjacent downstream turbine blades.

The first and second rotor discs are joined to the compressor by a corresponding rotor shaft for powering the compressor during operation. These are typically referred to as the high pressure turbine. The turbine engine may include a number of stages of static air foils, commonly referred to as vanes, interspaced in the engine axial direction between rotating air foils commonly referred to as blades. A multistage low pressure turbine follows the two stage high pressure turbine and is typically joined by a second shaft to a fan disposed upstream from the compressor in a typical turbofan aircraft engine configuration for powering an aircraft in flight.

As the combustion gases flow downstream through the turbine stages, energy is extracted therefrom and the pressure of the combustion gas is reduced. The combustion gas is used to power the compressor as well as a turbine output shaft for power and marine use or provide thrust in aviation usage. In this manner, fuel energy is converted to mechanical energy of the rotating shaft to power the compressor and supply compressed air needed to continue the process.

Turbine rotor assemblies typically include at least one row of circumferentially-spaced rotor blades. Each rotor blade includes an airfoil that having a pressure side and a suction side connected together at leading and trailing edges. Each airfoil extends radially outward from a rotor blade platform. Each rotor blade may also include a dovetail that extends radially inward from a shank extending between the platform and the dovetail. The dovetail is used to mount the rotor blade within the rotor assembly to a rotor disk or spool. Known blades are hollow such that an internal cooling cavity is defined at least partially by the airfoil, platform, shank, and dovetail.

To facilitate preventing damage to the airfoils from exposure to high temperature combustion gases, known airfoils include an internal cooling circuit which channels cooling fluid through the airfoil. At least some known high pressure turbine blades include an internal cooling cavity that is serpentine such that a path of cooling gas is channeled radially outward to the blade tip where the flow reverses direction and flows back radially inwardly toward the blade root. The flow may exit the blade through the root or the flow may be directed to holes in the trailing edge to permit the gas to flow across a surface of the trailing edge for cooling the trailing edge. Specifically, at least some known rotor blades channel compressor bleed air into a cavity defined between the sidewalls, to convectively cool the sidewalls. Additional cooling can be accomplished using impingement cooling wherein impingement inserts channel cooling fluid through impingement jet arrays against the inner surface of the airfoil's leading edge to facilitate cooling the airfoil along the leading edge. However, these circuits, limited by manufacturing constraints, are inefficient as the circuits channel the cooling fluid through the center of the cavity where it is ineffective in removing heat from the walls of the airfoil.

As may be seen by the foregoing, these and other deficiencies should be overcome to improve flow of cooling air through a rotor blade assembly.

SUMMARY

According to exemplary embodiments, an air cooled turbine blade, comprises a blade having a pressure side and a suction side extending between a leading edge and a trailing edge, the blade having a hollow cavity, a plurality of chambers extending radially through the blade, groups of the chambers defining multiple circuits passing through the turbine blade, a first one of said circuits extending upwardly along said suction side, said first one of said circuits isolated from said pressure side by a second one of said circuits, a backbone rib disposed between a portion of said first one of said circuits and said second one of said circuits.

According to other exemplary embodiments, a method of cooling a turbine blade having a leading edge, trailing edge, a suction side, a pressure side, a plurality of chambers defining circuits comprises directing compressed air through two of the chambers located along a suction side of the turbine blade, isolating the two of the chambers along the suction side with at least one circuit, the at least one circuit including a transverse chamber extending between a pressure side and a suction side, merging the two of the chambers near a blade tip in to a tip flag chamber, extending the tip flag chamber in an aft direction toward the trailing edge.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of this invention, and the manner of attaining them, will become more apparent and the cooling of the gas turbine rotor blades will be better understood by reference to the following description of embodiments taken in conjunction with the accompanying drawings, wherein.

DETAILED DESCRIPTION

Figure 1:
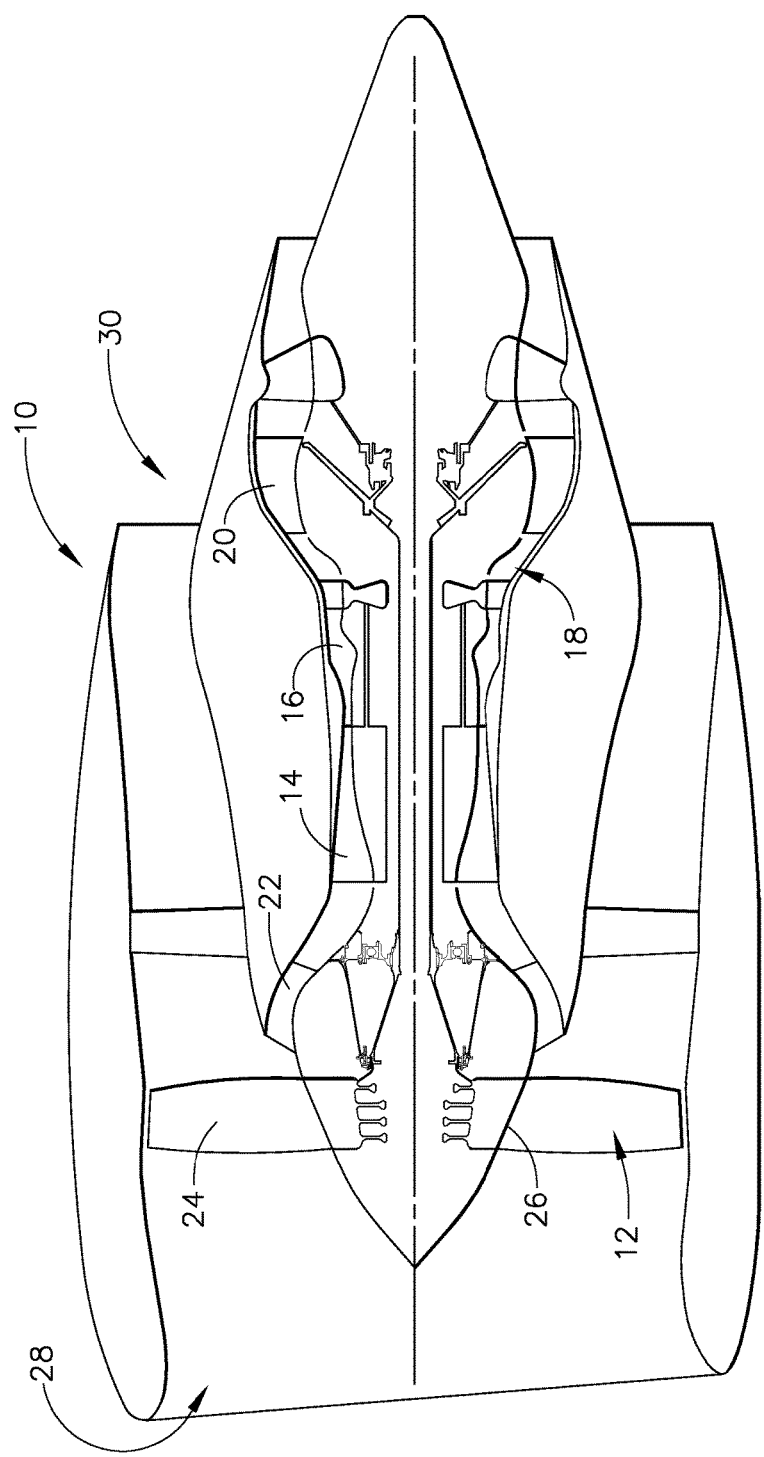
FIG. 1 is a schematic illustration of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring now to FIGS. 1-5, various embodiments of methods and apparatuses for cooling gas turbine rotor blades are depicted. The exemplary turbine blades comprise a plurality of chambers defining circuits for delivery of high pressure compressor discharge air to cool a turbine blade. The blade circuits include at least one chamber which insulates cooler section cavities from hotter pressure side air. Additionally, the at least one of the chamber extends between the pressure side and the suction side to interrupt a backbone rib or partition.

The terms fore and aft are used with respect to the engine axis and generally mean toward the front of the turbine engine or the rear of the turbine engine in the direction of the engine axis.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, engine 10 is a CT7 engine commercially available from General Electric Aircraft Engines, Cincinnati, Ohio.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
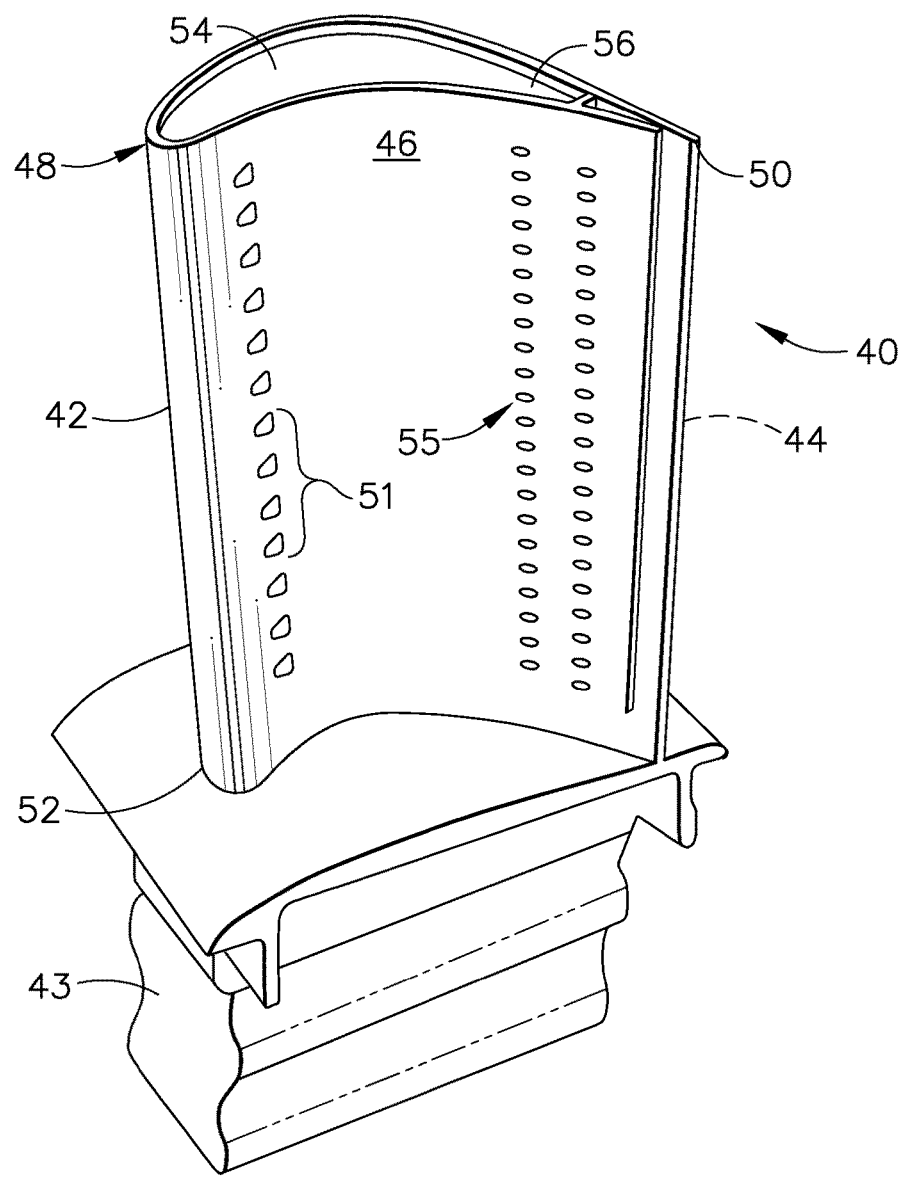
FIG. 2 is a perspective view of an exemplary rotor blade that may be used with the gas turbine shown in FIG. 1.
Figure 3:
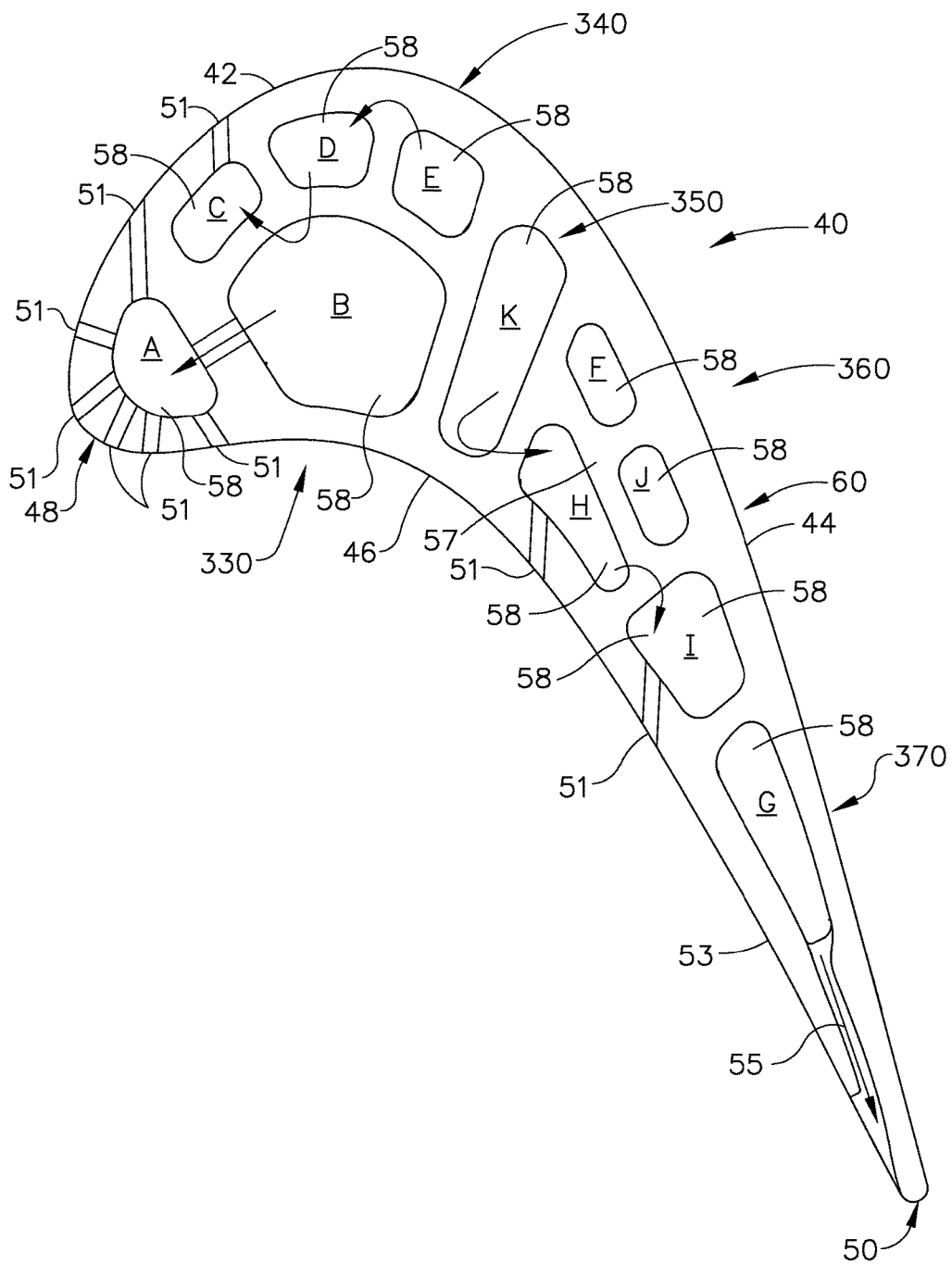
FIG. 3 is a cross-sectional view of the rotor blade shown in FIG. 2.

FIG. 2 is a perspective view of a rotor blade 40 that may be used with gas turbine engine 10 (shown in FIG. 1). FIG. 3 is a cross-sectional view of the rotor blade 40. Each rotor blade 40 includes a hollow airfoil 42 and an integral dovetail 43 used for mounting airfoil 42 to a rotor disk (not shown) in a known manner. In one embodiment, a plurality of rotor blades 40 form a high pressure turbine rotor blade stage (not shown) of gas turbine engine 10. Although an exemplary blade is referred to in the instant embodiments, the cooling circuits and chambers described herein may be utilized with various types of airfoils and is not limited to turbine blades.

The airfoil 42 includes a first sidewall 44 and a second sidewall 46. First sidewall 44 is convex and defines a suction side of airfoil 42, and second sidewall 46 is concave and defines a pressure side of airfoil 42. Sidewalls 44 and 46 are connected together at a leading edge 48 and at an axially-spaced trailing edge 50 of airfoil 42 that is downstream from leading edge 48. Airfoil 42 includes a plurality of film holes 51 that are spaced radially along sidewalls 44 and 46 and between an airfoil tip 54 and a blade root 52 for discharging cooling fluid from airfoil 42 to facilitate cooling an outer surface 53 of airfoil 42. Airfoil 42 also includes a plurality of trailing edge slots 55 spaced radially between airfoil tip 54 and blade root 52 along trailing edge 50 for discharging cooling fluid from airfoil 42 to facilitate cooling airfoil trailing edge 50. Heat transfer enhanced by film holes 51 and trailing edge slots 55 facilitates cooling along airfoil outer surface 53.

First and second sidewalls 44 and 46, respectively, extend radially from blade root 52 positioned adjacent dovetail 43 to airfoil tip 54 which defines a radially outer boundary of an internal cavity 56. Cavity 56 is defined within airfoil 42 between sidewalls 44 and 46. In the exemplary embodiment, cavity 56 is divided into a plurality of cooling chambers 58 which form cooling circuits 60 that target specific areas of airfoil 42. The cooling chambers 58 provide for fluid movement in a radial direction between the root 52 and the tip 54 and generally through inter-cavity paths to define circuits 60. In the exemplary embodiment, five cooling circuits 60 are provided. However, this is non-limiting as various numbers of circuits may be formed with cavities of varying sizes. Specifically, in the exemplary embodiment, cooling circuits 60 include cooling circuits 330, 340, 350, 360, and 370. In an alternative embodiment, airfoil 42 has more than five cooling circuits.

This cooled turbine blade is separated into five distinct cooling circuits, covering the whole of the airfoil 42. The chambers generally labeled as chamber 58 are specifically labeled A-J. Impingement chamber A is located near the leading edge or front face of the blade 40. The impingement chamber A is in fluid communication with a direct feed up-path chamber B. The up-path chamber B extends radially through the blade 40 from the root 52 to the tip 54. Chambers C, D and E are high curvature region chambers which are in flow communication with one another. More specifically, chamber E is an up-path chamber, chamber D is a down chamber and chamber C is an up-path. These chambers E, D, C define the serpentine circuit 340 in flow communication near the tip 54 and root 52.

Chambers A-E define a forward portion of cavities. The forward cavities are separated from rearward cavities by a transverse chamber K which extends from the suction side 44 to the pressure side 46. Chambers F and J are disposed toward the trailing edge 50 the blade 40 and are adjacent the suction side of the blade 40. This area of the blade 40 is cooler during operation due to air acceleration across this region and therefore chambers F and J extend radially from the blade root 52 and extend toward the trailing edge to cool the trailing tip 50, which is a high heat region of the blade 40. Opposite chambers F and J and rearward of chamber K is chamber H, which is adjacent the hotter pressure side. Rearward of chamber H are chambers I and G in the direction of the trailing edge.

A backbone rib 57 is disposed between the chambers F and J on the suction side, and chamber H on the pressure side. The backbone rib 57 is interrupted by the chamber K which extends from the suction side 44 and the pressure side 46. The backbone rib 57 further isolates the cooler chambers F and J from the warmer pressure side 46 of the blade 40.

With reference now to the circuits defined by the plurality of cavities, in the first circuit 330, the high pressure compressed air flows radially upward from the root 52 in cavity B and through a number of cross over holes spanning root to tip into cavity A. The air then exits through a number of film holes 51 out of cavity A. This creates a film on the front face of the blade 40 in the area of the leading edge 48. The film creates an insulation layer about the turbine blade 40 to protect the blade from the distressing effects of the high temperature combustion gas engaging the turbine 20.

A second circuit 340 located at the high curvature area of the blade 40 and is a serpentine circuit formed by moving air from chamber E, to chamber D and to chamber C. The serpentine circuit 340 is generally isolated to a single side, the suction side, of the blade 40. Serpentine circuit 340 is circumferentially adjacent to circuit 330 and begins with the cooling flow coming up from the root 52 in chamber E, making a 180 degree turn at the tip 54, flowing down radially in chamber D, making another 180 degree turn at the root 52, and finishing by flowing up chamber C, to define the serpentine circuit. The air exits a number of film holes 51 in chamber C located along the suction side 44.

The third circuit, number 350, begins in the center of the airfoil with the air flowing radially upward from the root 52 in chamber K, making a 180 degree turn at the tip 54, flowing downward radially in chamber H, making an additional 180 degree turn at the root 52 and finishing by upward in chamber I. Air exits a number of film holes 51 in both cavities H and I to create the air film over the suction side of the blade 40 in this area.

The fourth circuit or tip flag circuit 360 begins with a single feed at the root 52 that branches off into two separate chambers, F and J, allowing the air to flow radially outward through both cavities. At the tip 54 the two chambers, F and J, make a 90 degree turn towards the aft end of the blade 40 and merge to form a single chamber or manifold 59 (FIG. 7) that extends toward the trailing edge 50 of the blade 40. This chamber or manifold 59 passes behind chamber I, which decreases in size to accommodate passage and passes over chamber G which stops lower radially. The air exits through film holes and slots at the end. The circuit 360 is shown as being isolated from by the surrounding circuit 350. While the circuit 350 is completely surrounding the circuit 360, the circuit 360 may be completely surrounded or partially surrounded to be within the scope of the isolation taught herein.

The chambers F and J are located along the suction side of 44 of the blade 40. This area is cooler than other surfaces due to acceleration of air moving across the surface 44 reducing temperature of the blade 40. As a result, this provides a desirable location to position the root cavities and the compressed cooling air moving through chambers F and J remains cooler than in other regions of the blade 40. Similarly, the chambers K, H and I surround the cooler chambers F and J. This provides some additional insulating properties by separating the warmer pressure side 46 from the chambers F and J, thus allowing the cooler air in chambers F and J to move radially upward through the blade 40 and cool the high heat area of the trailing edge 50.

The fifth and final circuit 370 consists only of chamber G. The air flows radially outward and exits through a number of slots 55 to the trailing edge 50 spread from root 52 to tip 54. This configuration allows the cooling air to be used more effectively in specific regions of the blade. The isolation between the two sides of the airfoil keeps the cooling air from getting too hot by reducing its exposure to the hot gas side heat load. By splitting the cooling air amongst the various regions of the airfoil, cavity sizes can also be optimized, allowing a larger number of cavities to be present than a conventional design. Chamber K, which extends between both sides of the airfoil, is designed in such a way to break up the central rib 57, between chambers B and C through E and chambers F and H and J. This design feature reduces the thermal load on the airfoil by allowing the airfoil to grow as it heats up in the engine.

Figure 4:
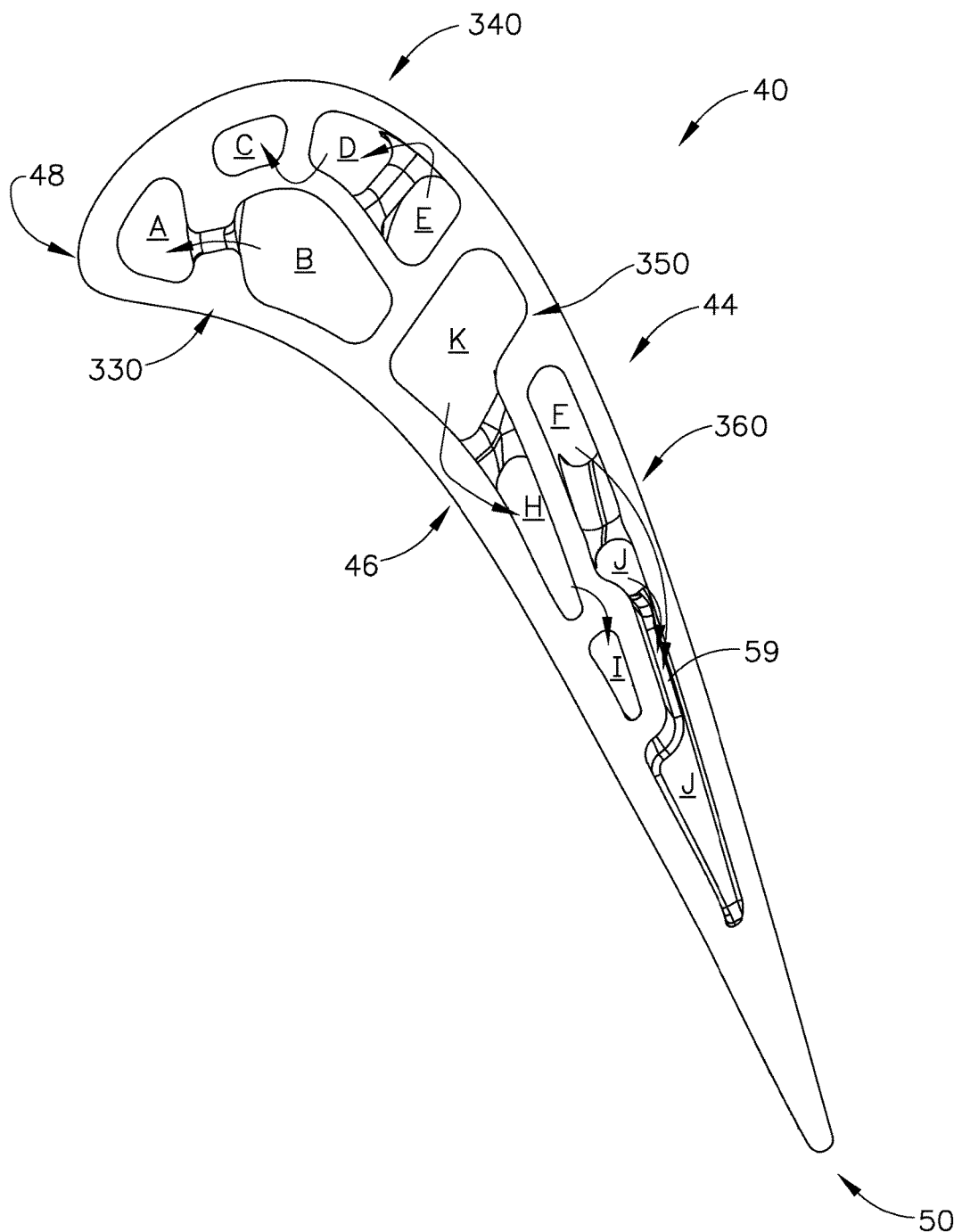
FIG. 4 is a second cross-sectional view of the rotor blade at an elevation different than FIG. 3; and, FIG. 5 is a lower isometric view of a turbine blade with a partial cutaway to reveal various chambers and cooling circuits.

Referring now to FIG. 4, a second cross sectional view of the blade 40 is shown. The section cut is taken at an elevation which is higher than that of FIG. 3 so that the tip flag circuit 360 is shown more completely in this view. In this view, the various chambers 58 of the rotor blade 40 are shown as well as the relationship of the chambers 58A-J to define various circuits. Beginning at the leading edge end of the blade 40, the first circuit 330 includes chamber A receiving compressed cooling air from through-holes in chamber B. These through holes extend radially and may comprise one or more holes.

The serpentine circuit 340 receives air from the root end 52 (FIG. 2) of the blade 40 passing upwardly through chamber E and turning near the blade tip to move downward through chamber D. At the bottom of the chamber D, the air turns again and moves radially upward through chamber C. Although the circuit moves air toward the leading edge, it is within the scope of the present embodiments that the cooling air move from chamber C to chamber E.

Moving toward the trailing edge, the next circuit encountered is circuit 350. The circuit 350 includes chambers K, H and I wherein cooling air moves upwardly through chamber K, moves downwardly through H and turns upwardly to chamber I. Again the direction of air may be reversed both radially and axially.

Also shown in FIG. 4, is the tip flag circuit 360. The circuit 360 is represented by chambers F and J. The chambers F and J extending radially within the blade 40 and cooling air moves radially or upward from the root 52 through these chambers. Near the tip 54, the chambers F and J turn aft and merge to form the manifold 59. This manifold extends toward the trailing edge to provide cooling near the edge 50.

Additionally shown in this view, the chambers K, H and I surround the circuit 360. This provides isolation and buffering for the tip flag circuit 360 from the higher heat side 330 of the blade. The chamber K extends across the entirety between the suction side and the pressure side of the blade 40 and isolates one side of the tip flag circuit 360. Chamber I is disposed between the pressure side 46 and the chambers F and J. Additionally, the Chamber I extends upwardly from beneath the manifold 59 and changes shape to compensate for the passing of the manifold 59 toward the trailing edge 50.

Figure 5:
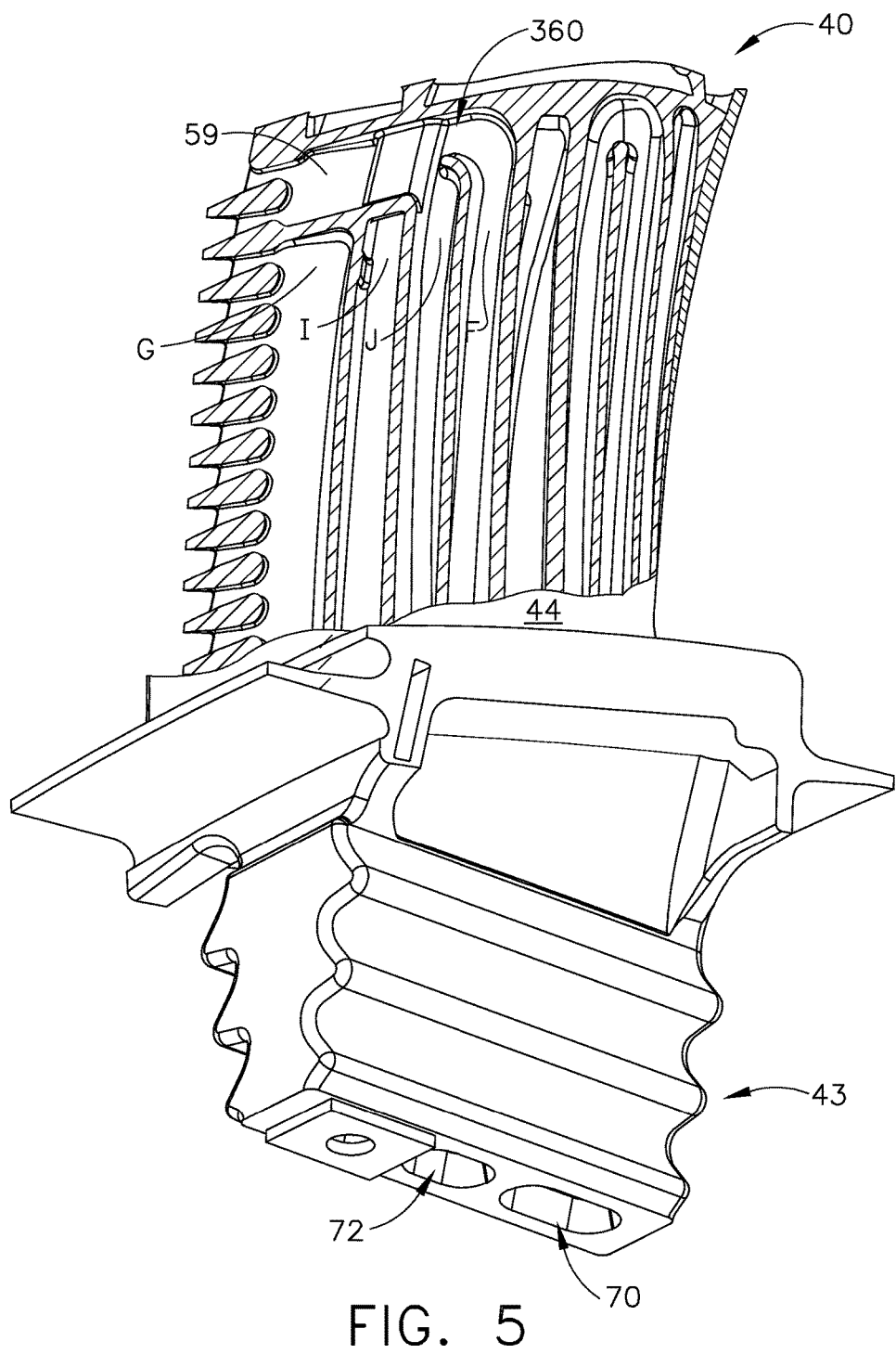

Referring now to FIG. 5, an isometric view of an exemplary blade 40 is shown from below to depict flowpath trunks 70, 72 feeding the lower portion of the blade dovetail. Starting at the bottom of the blade 40, a first circuit trunk 70 is depicted. The first circuit trunk 70 provides cooling air for the circuits 330, 340 and branches apart from the trunk to feed chambers B and E. Similarly, the second circuit trunk 72 branches apart to feed the aft chambers including circuits 350, 360. In this view, the hotter portions of the blade at the forward and leading edge locations are cooled by trunk 70 while the cooler air associated with the suction side 44 and specifically tip flag circuit 360 is provided from the second circuit trunk 72. As shown in the embodiment, chambers K, H and I define the circuit 350. Toward the upper end of the blade 40, a portion of the suction side 44 is removed to reveal various chambers and circuits. The tip flag circuit 360 is depicted wherein chambers F and J extend radially upward and turn to merge into a manifold 59 extending in the aft direction of the blade 40. The tip flag manifold 59 extends aft through the cavity 54 above the chambers I and G, as depicted with a portion of the side 44 wall removed. Alternatively, the manifold may feed into chamber G and subsequently out of the trailing edge 50.

The above-described rotor blade is cost-effective and highly reliable. The rotor blade includes an airfoil having a number of cooling circuits which target cooling on the leading edge, pressure side, and suction side of the airfoil. A number of cooling techniques are employed to cool the exterior sidewalls of the airfoil, such as impingement cooling and near-wall cooling. The arrangement of the various chambers within the cooling circuits facilitates isolation and insulation of cooling fluid, further facilitating cooling of the airfoil as a result of cooler cooling fluid passing through the various chambers. Such an arrangement is made possible by advances in fabrication techniques, including, but not limited to, rapid prototyping of ceramic cores. More specifically, traditional cooling schemes are limited by manufacturing constraints related to the manufacture of ceramic cores used to create the passageways and chambers within cooling circuits. New core production processes reduce such constraints imposed by hard tooling and enable the core to take new shapes and sizes. As a result, cooler operating temperatures within the rotor blade facilitate extending a useful life of the rotor blades in a cost-effective and reliable manner.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A rotor blade for a gas turbine engine having an optimized cooling circuit comprising:
   a blade having a blade root and a blade tip, said blade extending in a radial direction from said blade root to said blade tip and formed by at least one sidewall substantially defining a perimeter of said blade and a generally hollow cavity, said blade having a pressure side and a suction side;

at least four isolated cooling circuits, each of said isolated cooling circuits having at least two chambers extending in said radial direction from said blade root toward said blade tip and said at least two chambers in fluid communication allowing an airflow between said at least two chambers;

a plurality of exit holes in said at least one sidewall and connected to at least one of said isolated cooling circuits, said plurality of exit holes suitable for allowing said airflow to exit said blade;

at least one of said at least two chambers extending across said cavity from said pressure side to said suction side and transverse to a backbone rib;

at least one of said circuits being a tip flag circuit, said tip flag circuit extending from said blade root upwardly along a suction side, said tip flag circuit turning and extending toward said trailing edge;

wherein a radially inner portion of said tip flag circuit is separated from said pressure side by another of said at least two chambers.

2. The rotor blade of claim 1 wherein said at least one sidewall includes a convex first sidewall and a concave second sidewall, said convex first sidewall and said concave second sidewall extending in an axial direction from a leading edge to a trailing edge.

3. The rotor blade of claim 2 wherein said plurality of cooling circuits includes a pair of parallel chambers separated by a backbone rib, said backbone rib disposed within said blade and extending in said radial direction from said blade root to said blade tip and extending in said axial direction between a first chamber and a second chamber.

4. The rotor blade of claim 3 wherein said backbone rib is interrupted by a transverse chamber extending from said convex first sidewall to said concave second sidewall.

5. A rotor blade having an optimized cooling circuit for a gas turbine engine comprising:

a convex first sidewall extending in a radial direction from a blade root to a blade tip;

a concave second sidewall extending in said radial direction from a blade root to a blade tip;

said convex first sidewall and said concave second sidewall joining at a leading edge, diverging and rejoining at a trailing edge to form a perimeter of an interior cavity;

five cooling circuits disposed within said interior cavity, each of said cooling circuits having at least one chamber extending in a radial direction within said rotor blade and suitable for allowing an airflow to pass from said blade root toward said blade tip;

a first cooling circuit having a first chamber and a second chamber, at least one of which is disposed near said leading edge, said first chamber and said second chamber connected by at least one first cross over hole extending transverse to said radial direction;

a second cooling serpentine circuit having a third chamber, a fourth chamber, and a fifth chamber disposed near said convex first sidewall, said third chamber and said fourth chamber connected by a cross over hole disposed near said blade tip and extending transverse to said radial direction, said fourth chamber and said fifth chamber connected by a second cross over hole disposed near said blade root and extending transverse to said radial direction, said second cooling circuit being isolated from said concave second sidewall by said first cooling circuit;

a third cooling circuit having a sixth chamber and a seventh chamber, said sixth chamber at least partially defined on a first side by said convex first sidewall and on a second side by said concave second sidewall, said sixth chamber and said seventh chamber connected by a third cross over hole disposed near said blade tip and extending transverse to said radial direction;

a fourth cooling circuit having an eighth chamber and a ninth chamber, said eighth chamber and said ninth chamber partially separated by a fourth cooling circuit wall extending in said radial direction, said eight chamber and said ninth chamber merging at a location nearer said blade tip than said fourth cooling circuit wall and turning toward said trailing edge, said fourth cooling circuit being isolated from said concave second sidewall by said third cooling circuit at a radially inner portion; and a fifth cooling circuit disposed near said trailing edge and having a tenth chamber extending in said radial direction from said blade root toward said blade tip.

6. The rotor blade of claim 5 further comprising a plurality of leading edge holes extending transverse to said radial direction from said first cooling circuit through said perimeter formed by said convex first sidewall and said concave second sidewall near said leading edge, said leading edge holes suitable for allowing an airflow to pass from said first cooling circuit outside of said interior formed by side perimeter.

7. The rotor blade of claim 5 further comprising a plurality of trailing edge holes extending transverse to said radial direction from said fifth cooling circuit through said perimeter formed by said convex first sidewall and said concave second sidewall near said trailing edge, said trailing edge holes suitable for allowing an airflow to pass from said fifth cooling circuit outside of said interior formed by said perimeter.

8. The rotor blade of claim 7 wherein said third cooling circuit includes at least one passage extending through said perimeter and is suitable for allowing an airflow to pass from said third cooling circuit outside of said interior formed by said perimeter.

9. The rotor blade of claim 7 wherein said fourth cooling circuit includes at least one passage extending through said perimeter and is suitable for allowing an airflow to pass from said fourth cooling circuit outside of said interior formed by said perimeter.

10. An air cooled turbine blade, comprising:

a blade having a pressure side and a suction side extending between a leading edge and a trailing edge, said blade having a hollow cavity;

a plurality of chambers extending radially through said blade, groups of said chambers defining multiple circuits passing through said turbine blade;

a first one of said multiple circuits extending upwardly along said suction side, said first one of said multiple circuits isolated from said pressure side by a second one of said multiple circuits at a radially inner portion, said first one of said multiple circuits having at least two chambers; and a backbone rib disposed between a portion of said first one of said multiple circuits and said second one of said multiple circuits, wherein said at least two chambers turn and merge rearward toward said trailing edge for cooling said trailing edge.

11. The air cooled turbine blade of claim 10, said at least two chambers being direct up-path chambers.

12. The air cooled turbine blade of claim 11, said first one of said multiple circuits being a tip flag circuit.

13. The air cooled turbine blade of claim 10, said first one of said multiple circuits being isolated by said backbone rib and said second one of said multiple circuits.

14. The air cooled turbine blade of claim 10, further comprising a serpentine circuit along a high curvature portion of said blade.

15. The air cooled turbine blade of claim 10, further comprising a plurality of cooling film holes disposed along said leading edge of said blade.

16. The air cooled turbine blade of claim 10, further comprising a plurality of cooling film holes disposed along said suction side.

17. The air cooled turbine blade of claim 10 further comprising a transverse chamber extending between said pressure side and said suction side.

18. The air cooled turbine blade of claim 17 wherein air exits said transverse chamber and enters a downstream chamber adjacent said pressure side.

19. A method of cooling a turbine blade having a leading edge, trailing edge, a suction side, a pressure side, a plurality of chambers defining circuits, comprising:
flowing air through two of said plurality of chambers located along a suction side of the turbine blade;
isolating said two of said plurality of chambers along said suction side at a radially inner portion with at least one circuit, said at least one circuit including a transverse chamber extending between said pressure side and said suction side;
merging said two of said plurality of chambers near a blade tip in to a tip flag chamber;
extending said tip flag chamber in an aft direction toward said trailing edge.

* * * * *